(12) United States Patent
Zhou

(10) Patent No.: US 11,800,139 B2
(45) Date of Patent: Oct. 24, 2023

(54) MEMORY LATENCY MANAGEMENT FOR DECODER-SIDE MOTION REFINEMENT

(71) Applicant: Avago Technologies International Sales Pte. Limited, Singapore (SG)

(72) Inventor: Minhua Zhou, San Diego, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 310 days.

(21) Appl. No.: 17/187,606

(22) Filed: Feb. 26, 2021

(65) Prior Publication Data

US 2021/0185343 A1 Jun. 17, 2021

Related U.S. Application Data

(62) Division of application No. 16/446,462, filed on Jun. 19, 2019, now Pat. No. 10,965,951.

(60) Provisional application No. 62/688,748, filed on Jun. 22, 2018.

(51) Int. Cl.
*H04N 19/513* (2014.01)
*H04N 19/423* (2014.01)
*H04N 19/88* (2014.01)
*H04N 19/119* (2014.01)
*H04N 19/137* (2014.01)

(52) U.S. Cl.
CPC ......... *H04N 19/513* (2014.11); *H04N 19/119* (2014.11); *H04N 19/137* (2014.11); *H04N 19/423* (2014.11); *H04N 19/88* (2014.11)

(58) Field of Classification Search
CPC .. H04N 19/513; H04N 19/119; H04N 19/137; H04N 19/423; H04N 19/88

USPC .................................................... 375/240.16
See application file for complete search history.

(56) References Cited

U.S. PATENT DOCUMENTS

| 2001/0031003 A1 | 10/2001 | Sawhney et al. |
| 2009/0003447 A1 | 1/2009 | Chnstofferscn |
| 2018/0041769 A1 | 2/2018 | Chuang et al. |

FOREIGN PATENT DOCUMENTS

| WO | WO 2018/092868 | 5/2018 |
| WO | WO 2018/105757 | 6/2018 |
| WO | WO 2018/130206 | 7/2018 |
| WO | WO 2019/240970 | 12/2019 |

OTHER PUBLICATIONS

Chen, et al., "Decoder-Side Motion Vector Refinement Based on Bilateral Template Matching," Joint Video Exploration Team (JVET) of ITU-T SG 16 WP 3 and ISO/IEC JTC 1/SC 29/WG 11, 4th meeting, Chengdu, China, Oct. 2016, 4 pages.

(Continued)

*Primary Examiner* — Nguyen T Truong

(57) ABSTRACT

A system includes memory and at least one processor coupled to the memory. The processor processes a received bitstream to generate quantized data and control data. The process also generate decoded motion data based on a portion of the control data, fetches one or more reference blocks associated with a current prediction unit (PU) of a DPR based on the decoded motion data and generates refined motion data based on the decoded motion data and the one or more reference blocks. The processor further generates one or more inter-prediction blocks based on the refined motion data and the one or more reference blocks by performing a motion compensation operation.

20 Claims, 12 Drawing Sheets

(56) References Cited

OTHER PUBLICATIONS

Kamp, et al., "Decoder Side Motion Vector Derivation for Interframe Video Coding," IEEE 15th International Conference on Image Processing (ICIP) 2008, pp. 1120-1123.

Slowack, et al., "Flexible distribution of complexity by hybrid predictive-distributed video coding," Signal Processing, Image Communication, 2010, vol. 25, pp. 94-110.

MEMORY LATENCY MANAGEMENT FOR DECODER-SIDE MOTION REFINEMENT

CROSS-REFERENCE TO RELATED APPLICATIONS

This application is a divisional of U.S. patent application Ser. No. 16/446,462 filed Jun. 19, 2019 and claims the benefit of priority under 35 U.S.C. § 119 from U.S. Provisional Patent Application 62/688,748 filed Jun. 22, 2018, which are incorporated herein by reference in their entireties.

TECHNICAL FIELD

The present description relates in general to video encoding and decoding, and more particularly to, for example, without limitation, memory latency management for decoder-side motion refinements.

BACKGROUND

Video coding has been widely used for a variety of purposes such as compression of video for ease of transport, etc. Video coding has various areas that can be improved. For example, video coding may be improved for higher compression efficiency, higher throughput, etc. An encoded video has to be decoded by a decoder capable of motion-data reconstruction. The decoder-side motion estimation (DME) relies on the motion-data reconstruction to provide the initial motion vectors for refinement. The initial motion vectors also determine where to fetch reference blocks from the off-chip memory buffer for decoder-side motion-vector refinement and motion compensation. The reference-block fetch from off-chip memory takes some time and thus may cause a high latency that needs to be avoided.

BRIEF DESCRIPTION OF THE DRAWINGS

Certain features of the subject technology are set forth in the appended claims. However, for purposes of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute part of the detailed description. The detailed description includes specific details for providing a thorough understanding of the subject technology. However, the subject technology is not limited to the specific details set forth herein and may be practiced without one or more of the specific details. In some instances, structures and components are shown in a block-diagram form in order to avoid obscuring the concepts of the subject technology.

In a decoder, the initial motion vectors are provided based on motion data reconstruction, on which decoder-side motion estimation (DME) relies. The decoder-side motion-vector refinement and motion compensation are based on reference blocks that may be stored in off-chip memory. The initial motion vectors also determine where to fetch reference blocks from the off-chip memory buffer, which is a time-consuming process causing high memory-access latency. To avoid memory-access latency, it is required for a pipelined decoder to decode all the motion data for a decoder pipeline region (DPR) in advance at a first pipeline stage, so that all direct memory accesses (DMAs) for the reference-block fetches of the DPR can be issued together a couple of pipeline stages ahead of time, and all the reference-block data are available when the DME and/or motion compensation (MC) are performed for coding units (CUs) in the DPR at a following pipeline stage. However, if the DMA issuing for reference-block fetch and the DME have to be performed CU-by-CU interleaved and sequentially, the high-throughput decoder implementation will become impossible due to the memory-access latency caused by CU-by-CU reference-block fetch within a DPR. The key to avoiding a memory-access latency issue is being able to fetch all the reference blocks for a DPR before the DME takes place for the DPR. Therefore, the subject disclosure provides for at least the DME being decoupled from the DMA reference-block fetches. However, performing reference-block fetches requires knowledge of all the motion data for the DPR. To accomplish this, in some implementations, an additional functional block is added to the decoder so that the motion-data reconstruction is performed in two passes, as discussed in more detail herein.

Figure 1:
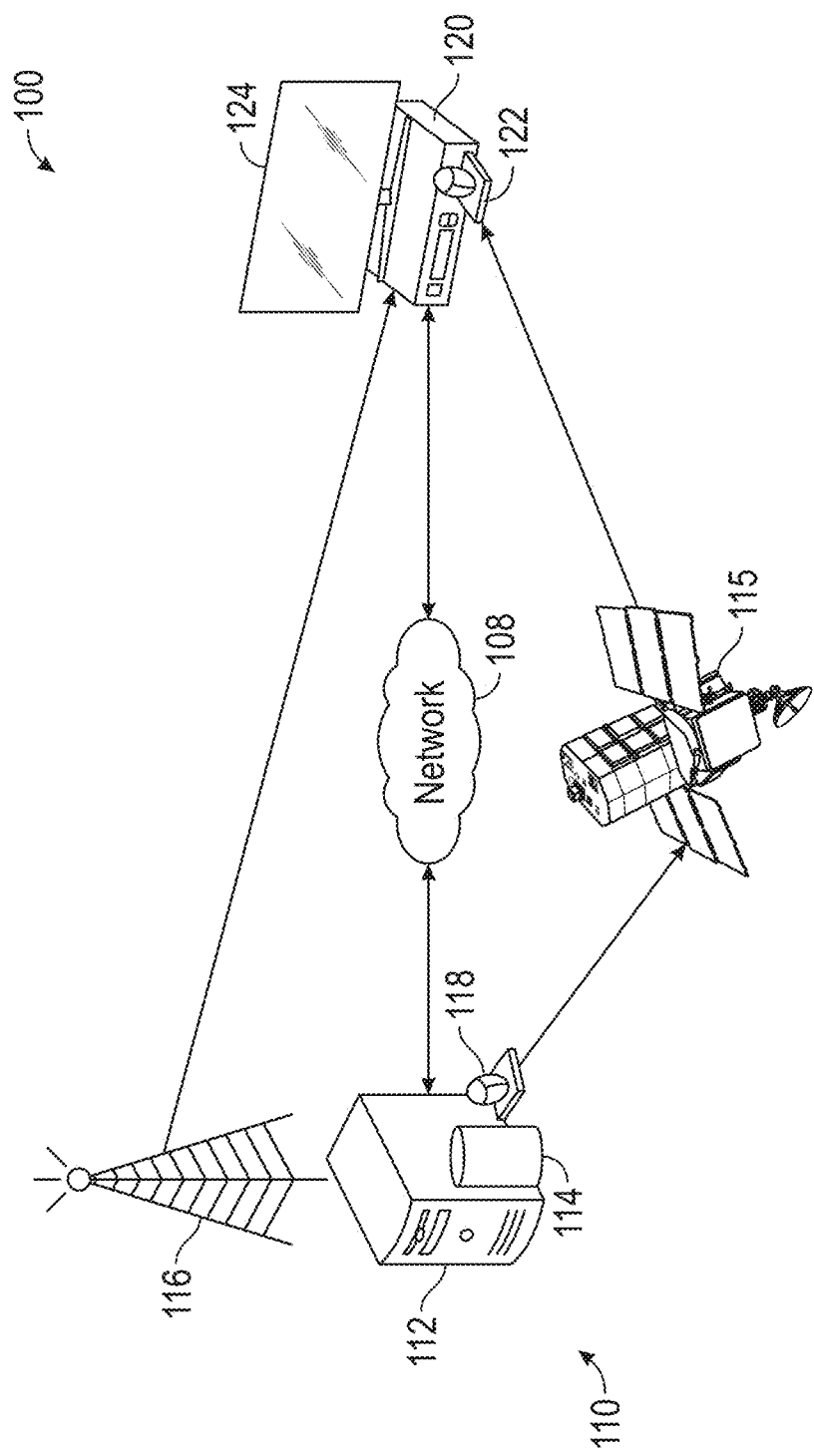
FIG. 1 illustrates an example of a network environment in which a video coding system may be implemented in accordance with one or more implementations of the subject technology.

FIG. 1 illustrates an example of a network environment 100 in which a video coding system may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network environment 100 includes a content delivery network (CDN) 110 that is communicably coupled to an electronic device 120, such as by a network 108. The CDN 110 may include, and/or may be communicably coupled to, a content server 112, an antenna 116 and a satellite transmitting device 118. The content server 112 can encode and/or transmit encoded data streams, such as AVC (Advanced Video Coding)/H.264 encoded video streams, HEVC (High-Efficiency Video Coding)/H.265 encoded video streams, VP9 encoded video streams, AV1 encoded video streams, and/or VVC (Versatile Video Coding)/H.266 encoded video streams, over the network 108. The antenna 116 transmits encoded data streams over the air, and the satellite transmitting device 118 can transmit encoded data streams to a satellite 115.

The electronic device 120 may include, and/or may be coupled to, a satellite receiving device 122, such as a satellite dish, that receives encoded data streams from the satellite 115. In one or more implementations, the electronic device 120 may further include an antenna for receiving encoded data streams, such as encoded video streams, over the air from the antenna 116 of the CDN 110. The content server 112 and/or the electronic device 120 may be, or may include, one or more components of the electronic system discussed below with respect to FIG. 12.

The network 108 may be a public communication network (such as the Internet, a cellular data network or dial-up modems over a telephone network) or a private communications network (such as private local area network (LAN) or leased lines). The network 108 may also include, but is not limited to, any one or more of the following network topologies, including a bus network, a star network, a ring network, a mesh network, a star-bus network, a tree or hierarchical network, and the like. In one or more implementations, the network 108 may include transmission lines, such as coaxial transmission lines, fiber optic transmission lines, or generally any transmission lines, that communicatively couple the content server 112 and the electronic device 120.

The content server 112 may include, or may be coupled to, one or more processing devices, a data store 114, and/or an encoder. The one or more processing devices execute computer instructions stored in the data store 114, for example, to implement a content delivery network. The data store 114 may store the computer instructions on a non-transitory computer-readable medium. The data store 114 may further store one or more programs, for example, video and/or audio streams, that are delivered by the CDN 110. The encoder may use a codec to encode video streams, such as an HEVC/H.265 codec, an AV1 codec, a VVC/H.266 codec, or any other suitable codec.

In some implementations, the encoder may encode a video stream using block-size dependent filter selection for motion compensation, and/or using shorter interpolation filters for small blocks, which may largely reduce the memory bandwidth usage with minimum quality impact. In one or more implementations, the horizontal and vertical interpolation can have different filter lengths, the current block and overlapped areas can have different filter lengths, and the reference block may have a different size than the current block.

In one or more implementations, the content server 112 may be a single computing device such as a computer server. Alternatively, the content server 112 may represent multiple computing devices that are working together to perform the actions of a server computer (such as a cloud of computers and/or a distributed system). The content server 112 may be coupled with various databases, storage services, or other computing devices, such as an adaptive bit rate (ABR) server, that may be collocated with the content server 112 or may be disparately located from the content server 112.

The electronic device 120 may include, or may be coupled to, one or more processing devices, a memory, and/or a decoder, such as a hardware decoder. The electronic device 120 may be any device that is capable of decoding an encoded data stream, such as a VVC/H.266 encoded video stream.

In one or more implementations, the electronic device 120 may be, or may include all or part of, a laptop or desktop computer, a smartphone, a tablet device, a wearable electronic device such as a pair of glasses or a watch with one or more processors coupled thereto and/or embedded therein, a set-top box, a television or other display with one or more processors coupled thereto and/or embedded therein, or other appropriate electronic devices that can be used to decode an encoded data stream, such as an encoded video stream.

In FIG. 1, the electronic device 120 is depicted as a set-top box, e.g., a device that is coupled to, and is capable of displaying video content on a display 124, such as a television, a monitor or any device capable of displaying video content. In one or more implementations, the electronic device 120 may be integrated into the display 124 and/or the display 124 may be capable of outputting audio content in addition to video content. The electronic device 120 may receive streams from the CDN 110, such as encoded data streams, that include content items, such as television programs, movies, or generally any content items. The electronic device 120 may receive the encoded data streams from the CDN 110 via the antenna 116, via the network 108, and/or via the satellite 115, and decode the encoded data streams, e.g., using the hardware decoder.

Figure 2:
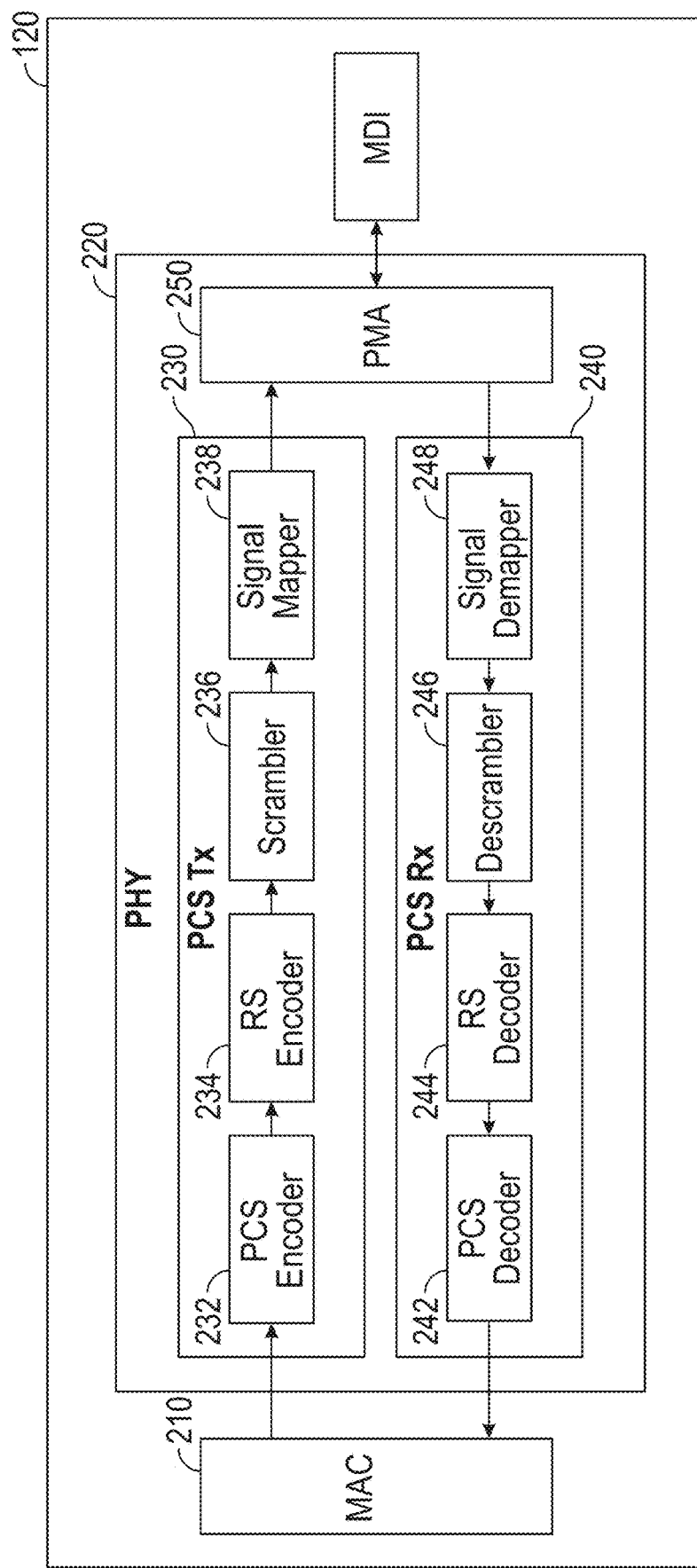
FIG. 2 illustrates an example of an electronic device that may implement memory latency management in accordance with one or more implementations.

FIG. 2 illustrates an example electronic device 120 that may implement memory latency management in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example electronic device 120 includes a media access control (MAC) module 210, a physical layer (PHY) module 220, and a medium dependent interface (MDI) 260. The PHY module 220 includes a physical coding sublayer (PCS) transmit (Tx) module 230, a PCS receive (Rx) module 240, and a physical medium attachment (PMA) module 250. In one or more implementations, the PCS Tx module 230 and the PCS Rx module 240 may be combined in a single PCS module. The PCS Tx module 230 includes a PCS encoder 232, a Reed Solomon (RS) encoder 234, a scrambler 236 and a signal mapper 238. The PCS Rx module 240 includes a PCS decoder 242, an RS decoder 244, a descrambler 246 and a signal demapper 248. The RS encoder 234 and RS decoder 244 may also be referred to as a forward error correction (FEC) encoder and decoder, respectively.

The MAC module 210 is communicatively coupled to the PHY module 220 via an interface, such as a gigabit medium independent interface (GMII), or any other interface, over which data is communicated between the MAC module 210 and the PHY module 220. The PCS encoder 232 performs one or more encoding and/or transcoding functions on data received from the MAC module 210, such as 80b/81b line encoding. The RS encoder 234 performs RS encoding on the data received from the PCS encoder 232. The scrambler 236 is an additive or synchronous scrambler such that bit errors would not result in descrambler re-synchronization, as may be the case for multiplicative scramblers. The scrambler 236 is placed after the RS encoder 234 and scrambles the RS encoded data by performing an exclusive-or (XOR) operation on the RS encoded data and a scrambling sequence. In one or more implementations, the scrambler 236 is always enabled throughout normal data mode, low power idle mode (while the RS encoder 234 is active), and low power idle refresh mode (when the RS encoder 234 is inactive). In the low-power idle (LPI) refresh mode, the reference scrambler sequence can be regenerated for improved performance. The signal mapper 238 maps the scrambled data to symbols, such as by mapping 3-bits to 2-ternary pulse-amplitude modulation (PAM) symbols (3B/2T), or generally any bit to symbol mapping. The symbols are then passed to the PMA module 250.

In one or more implementations, the PHY module 220 may further include a hybrid circuit (not shown) that is configured to separate the echoes of transmitted signals from the received signals. Any residual echoes may be further removed by digital echo cancellation.

The PMA module 250 performs one or more functions to facilitate uncorrupted data transmission, such as adaptive equalization, echo and/or crosstalk cancellation, automatic gain control (AGC), etc. The MDI 260 provides an interface from the PHY module 220 to the physical medium used to carry the data, for example, a transmission line, to a secondary electronic device (not shown for simplicity).

The PMA module 250 receives symbols transmitted over the transmission lines, for example, from the secondary electronic device, via the MDI 260 and provides the symbols to the PCS Rx module 240. The signal demapper 248 maps the symbols to scrambled bits, such as by demapping 3-bits from 2-ternary PAM symbols. The descrambler 246 descrambles the scrambled bits using scrambler synchronization information received from the secondary electronic device, such as a scrambler seed that was provided by the secondary electronic device during the training stage. The RS decoder 244 performs RS decoding on the descrambled data, and the PCS decoder 242 performs one or more decoding and/or transcoding functions on data received from the RS decoder 244, such as 80b/81b line decoding. The PCS decoder 242 transmits the decoded data to the MAC module 210.

In one or more implementations, one or more of the MAC module 210, the PHY module 220, the PCS Tx module 230, the PCS encoder 232, the RS encoder 234, the scrambler 236, the signal mapper 238, the PCS Rx module 240, the PCS decoder 42, the RS decoder 244, the descrambler 246, the signal demapper 248, the PMA module 250, the MDI 260 or one or more portions thereof may be implemented in software (e.g., subroutines and code), may be implemented in hardware (e.g., an application-specific integrated circuit (ASIC), a field programmable gate array (FPGA), a programmable logic device (PLD), a controller, a state machine, gated logic, discrete hardware components, or any other suitable devices) and/or may be implemented in a combination of both.

Figures 3A, 3B:
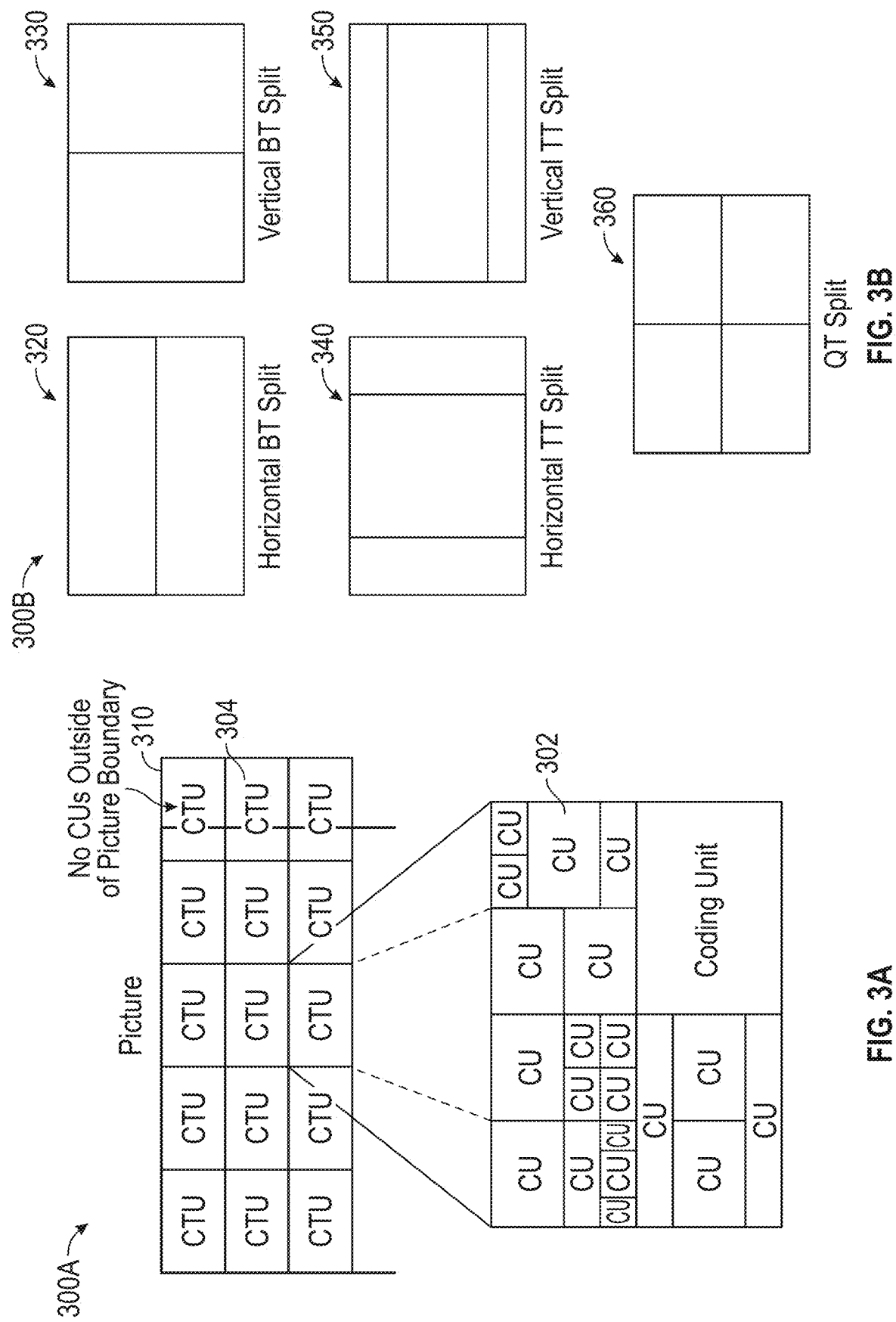
FIGS. 3A and 3B illustrate a schematic diagram of an example of a block partitioning structure used in versatile video coding (VVC) standard and an example of a recursive splits scheme.

FIG. 3A illustrates a schematic diagram of an example of a block partitioning structure 300A used in a VVC standard. In some aspects, the VVC standard is a new video compression standard being developed by the joint video experts team (JVET) jointly established by international organization for standardization (ISO)/international electro-technical commission (IEO) moving picture experts group (MPEG) and ITU-T. The VVC standard for single layer coding will be finalized by the end of 2020, with a design goal of being at least 50% more efficient than the previous standard MPEG HEVC/ITU-T H.265 Main-10 profile.

To achieve better coding efficiency, the VVC standard employs a flexible block coding structure. As shown in FIG. 3A, in the first test model of VVC (VTM1.0), a picture 310 is divided into a number of coding-tree units (CTUs) 304 that can have a size of up to 128×128. A CTU contains pixels from three color components, for example, a 128×128 CTU may contain 128×128 luma pixels and associated chroma pixels (e.g. 64×64 chroma pixels for each of chrominance component for 4:2:0 chroma-format). A CTU 304 is further decomposed into coding units (CUs) 302 of different sizes, by using recursive splits of coding units.

FIG. 3B illustrates a recursive splits scheme 300B. The recursive splits 300B is a so-called quad-tree plus binary and triple-tree (QTBTT) recursive block partitioning scheme that is used to divide a CTU into multiple CUs, in which a CU can have a two-way split by using a horizontal binary tree (BT) partitioning (split) 320 or a vertical BT partitioning 330. A three-way split can also be achieved by using a horizontal triple-tree (TT) partitioning 340 or a vertical TT partitioning 350. The CU can also have a four-way split by using a quad-tree (QT) partitioning 360. A CU can be as large as a CTU, and as small as 4×4 in block size.

In the VVC standard, in general there is no concept of splitting a CU into prediction units (PUs) and transform units (TUs) at CU level as was done in the HEVC standard. A CU is normally also a PU and TU, a except for the case in which the CU size may be larger than the maximum TU size allowed (e.g., when CU size is 128×128, but the maximum TU size is 64×64), where the CU is forced to split into multiple PUs and/or TUs. Additionally, there are occasions where the TU size is smaller than the CU size, namely in Intra Sub-Partitioning (ISP) and Sub-Block Transforms (SBT). Intra sub-partitioning (ISP) splits an intra-CU, either vertically or horizontally, into 2 or 4 TUs (for lama only, chroma CU is not split). Similarly, sub-block transforms (SBT) splits an inter-CU into either 2 or 4 TUs, and only one of these TUs is allowed to have non-zero coefficients. Within a CTU, some CUs can be intra-coded, while others can be inter-coded. Such a block structure offers the coding flexibility of using different CU/PU/TU sizes based on characteristics of incoming content, especially the ability to use large block size tools (e.g., large PU size up to 128×128, large TU and quantization block size up to 64×64), providing significant coding gain when compared to the MPEG HEVC/international telecommunication union (ITU)-T H.265 coding.

Figure 4:
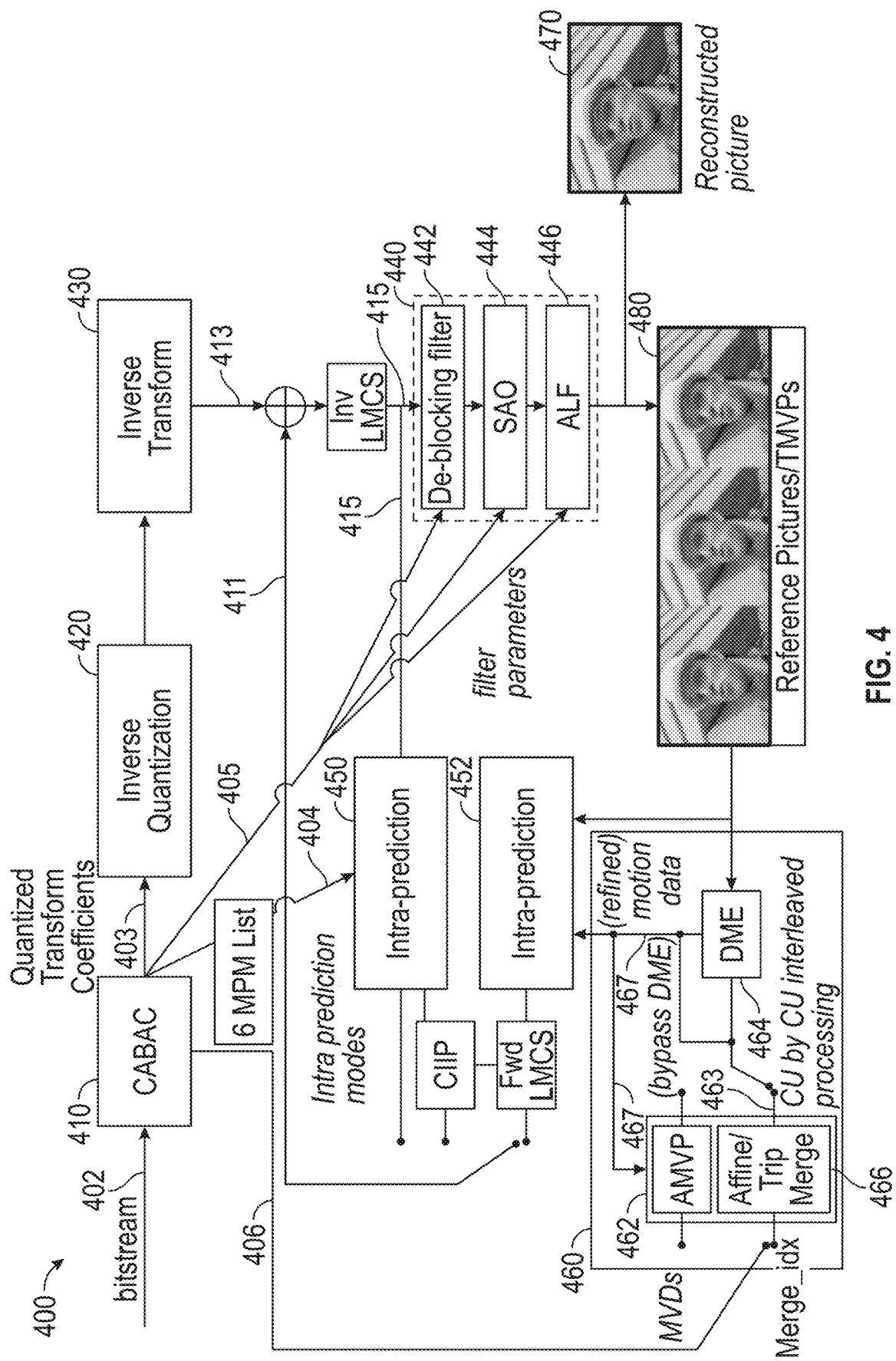
FIG. 4 illustrates a schematic diagram of an example of a VVC decoder.

FIG. 4 illustrates a schematic diagram of an example of a VVC decoder 400. In comparison to prior video coding standards, the VVC standard employs block-based intra/inter prediction, transform and quantization, in-loop filtering and entropy coding to achieve compression. The VVC decoder 400 includes a context adaptive binary arithmetic coding (CABAC) engine 410, an inverse quantization block 420, an inverse transform block 430, an intra-prediction block 450, an inter-prediction block 452, an in-loop filter block 440 and a CU-by-CU interleaved processing block 460 for motion data reconstruction. Similar to HEVC, the VVC standard employs the CABAC for entropy coding. The CABAC engine 410 decodes the incoming bitstream 402 and delivers the decoded symbols including quantized transform coefficients 403 and control information such as delta intra-prediction modes 404, motion vector differences (MVDs) and merge indices (merge_idx) 406 and quantization scales and in-loop filter parameters 405. The intra-prediction modes for the current CU may be reconstructed by adding together the decoded delta intra-prediction mode 404 and the selected candidate form of the 6 candidates based most-probable modes (MPMs) list. The MPM list for a CU may be derived by using the intra prediction modes of neighboring CU. The quantized transform coefficients 403 pass through the processing of inverse quantization by the inverse quantization block 420 and inverse transform via the inverse transform block 430 to reconstruct the prediction residual blocks for a CU 413.

The VVC decoder 400 can perform either intra-prediction or inter-prediction (i.e., motion compensation) to produce the prediction blocks for the CU. The prediction residual blocks 413 are added back to the prediction blocks 411 to generate the reconstructed blocks 415 for the CU. Finally, the in-loop filtering may be performed on the reconstructed blocks 415, via the in-loop filter block 440, to generate the reconstructed CU of a picture 470, which is stored in a decoded picture buffer (DPB) 480. The in-loop filter block 440 can, for example, include a de-blocking filter 442, a sample-adaptive offset (SAO) filter 444 and an adaptive loop filter (ALF) 446. For hardware and embedded software decoder implementations, the DPB is often allocated on off-chip memory due to data size of reference pictures.

For an inter-coded CU (a CU using inter-prediction modes), the motion data reconstruction is a CU-by-CU interleaved processing, and is performed by a processing block 460 that includes an advanced motion vector predictor (AMVP) list derivation block 462, an affine/triangle/regular merging/skip list derivation block 466, and a DME block 464. In some implementations, the DME block 464 can be bypassed. There are two modes to signal motion data in the bitstream. If the motion data, such as motion vectors, prediction direction (list 0 and/or list 1) and reference index (indices) of an inter PU is inherited from spatial or temporal neighbors of the current PU, either in merge mode or in skip mode, only the merge index (merge_idx) is signaled for the PU, and the actual motion data used for motion compensation can be derived by constructing a merging/skip candidate list and then addressing it by using the merge_idx by the affine/triangle/regular merging/skip list derivation block 466. On the contrary, if an inter-coded CU is not using merge or skip mode, the associated motion data is reconstructed on the decoder side by adding the decoded motion vector differences to the AMVPs by the AMVP block 462. Both the merging/skip candidate list and the AMVP list of a PU can be derived by using spatial and temporal motion-data neighbors. The temporal motion data neighbors (temporal motion-vector predictors, TMVPs) are stored in the DPB 480 along with the reference pictures. The motion data delivered by either the AMVP block 462 or the affine/triangle/regular merging/skip list derivation block 466 can be further refined by the DME block 464.

Figure 5:
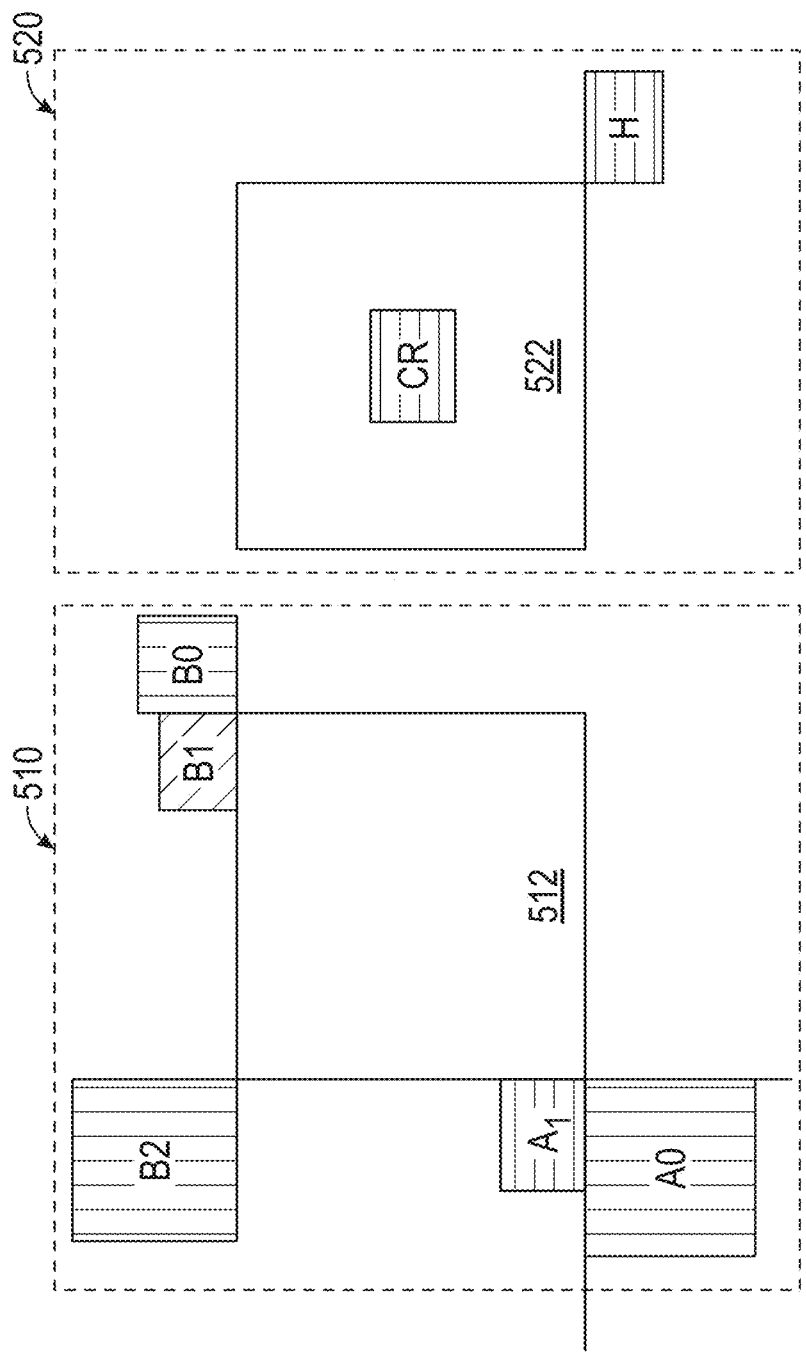
FIG. 5 illustrates an example of spatial and temporal motion-data candidate positions for merging candidate list derivation.

FIG. 5 illustrates an example of motion-data candidate positions for merging candidate list derivation. As mentioned above, merge/skip mode allows an inter-predicted PU to inherit the same motion vector(s), prediction direction, and reference picture(s) from an inter-predicted neighboring PU which contains a motion-data position selected from a group of spatially neighboring motion-data positions and one of two temporally co-located motion-data positions. For example, FIG. 5 illustrates candidate motion-data positions for the merge/skip mode as defined in the VVC (same for HEVC) in two blocks 510 and 520. In the block 510, for a current PU 512, a merging/skip candidate list is formed by considering merging candidates from the seven motion-data positions depicted in FIG. 5. For the current PU 512, there are five spatially neighboring motion-data positions, such as a bottom-left neighboring motion-data position A1, an upper neighboring motion-data position B1, an upper-right neighboring motion-data position B0, a down-left neighboring motion-data position A0 and an upper-left neighboring motion-data position B2. In the block 520, a motion-data position is shown at the bottom right to a temporally co-located PU 522, and a motion-data position CR is at the center of the temporally co-located PU 522. To derive motion data from a spatial neighboring motion-data position, the motion data is copied from the corresponding PU which contains (or covers) the motion-data position. To derive motion data from a temporal neighboring motion-data position, the motion data fetched from the corresponding PU which contains (or covers) the motion-data position may be scaled based on the temporal distances of the current picture and reference pictures.

The spatial merging candidates, if available, are ordered in the order of A1, B1, B0, A0 and B2 in the merging candidate list. The merging candidate at position B2 is discarded if the merging candidates at positions A1, B1, B0 and A0 are all available. A spatial motion-data position is treated as unavailable for the merging candidate list derivation if the corresponding PU containing the motion-data position is intra-coded, belongs to a different slice from the current PU 512 or is outside the picture boundaries.

To choose the co-located temporal merging candidate, the co-located temporal motion data from the bottom-right motion data at position H outside the co-located PU 522 is first checked and selected for the temporal merging candidate if available. Otherwise, the co-located temporal-motion data at the central motion-data position CR is checked and selected for the temporal merging candidate if available. The temporal merging candidate is placed in the merging candidate list after the spatial merging candidates. A temporal motion-data position (TMDP) is treated as unavailable if the corresponding PU containing the temporal motion-data position in the co-located reference picture is intra-coded or outside the picture boundaries.

After adding available spatial and temporal neighboring motion data to the merging list, the list can be appended with the historical merging candidates, average and/or zero candidates until the merging candidate list size reaches a pre-defined maximum size (e.g., 6).

Among all the coding tools proposed for VVC, the DME or decoder-side motion refinement has gained some momentum because of relatively high coding gain among all the coding tools proposed to the VVC standardization.

Referring back to FIG. 4, the DME is an additional motion-data processing step taken by the DME block 464, which does not exist in the previous video coding standards. If an inter-coded PU is signaled using the mode, the motion data decoded from the AMVP mode or merge/skip mode (i.e., the decoded motion data) is further refined by using the DME, and the refined motion data, instead of the decoded motion data, is used for inter-prediction (motion compensation). Otherwise, the decoded motion data is directly used for motion compensation of the PU. Furthermore, if the DME mode is used for the current PU, in VTM1.0 the refined rather than the decoded motion data of the current PU is fed back to the AMVP or merge/skip candidate list derivation of the next PU. Therefore, within a CTU (e.g. 128×128 size) or a DPR (decoder pipeline region, e.g. 64×64) the motion-data reconstruction of the AMVP or the merge/skip mode and the DME are interleaved CU-by-CU (note that a CU is also a PU in the VVC). The minimum DPR size normally depends on the maximum TU size allowed for a standard. For example, in VVC the DPR size can be set to 64×64 instead of 128×128 (i.e., CTU size), because the maximum CTU size and TU size are set to 128×128 and 64×64, respectively. Using a smaller DPR size saves the decoder local buffer size and thus reduces the decoder implementation cost. Of course, a DPR size of 128×128 for VVC can also be used if an implementation chooses to do so.

Figure 6:
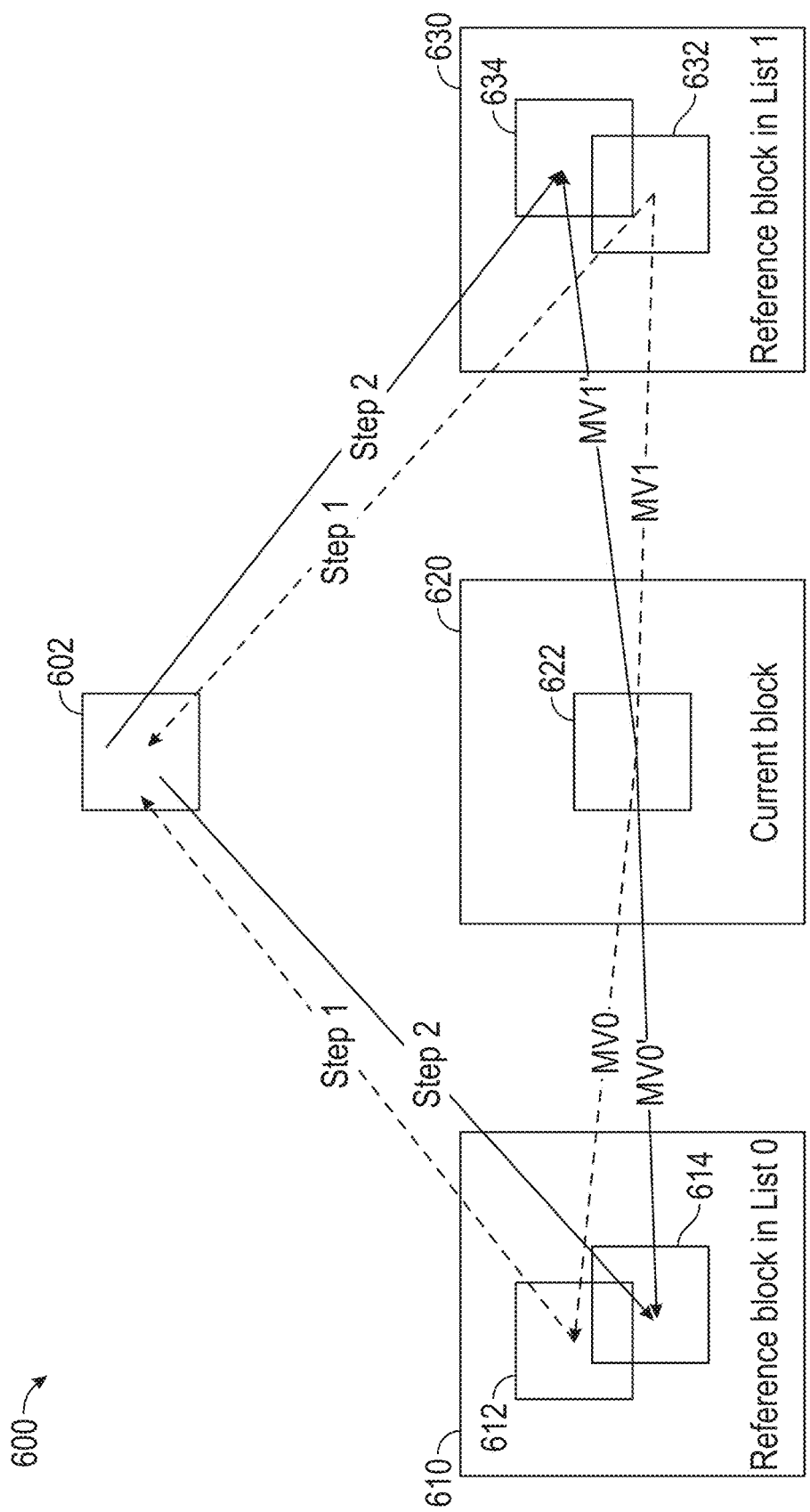
FIG. 6 illustrates a schematic diagram of an example of a decoder-side motion-vector refinement (DMVR) scheme based on bilateral template matching.

FIG. 6 illustrates a schematic diagram of an example of a decoder-side motion-vector refinement (DMVR) scheme 600 based on bilateral template matching. The DMVR scheme 600 is one example of DME methods proposed to the VVC standard. In the DMVR scheme 600, a picture 620 is a current picture and reference pictures 610 and 630 are temporal neighbor pictures. For example, the reference picture 610 can be a temporal backward picture (i.e. list 0 reference picture) and the reference picture 630 can be a temporal forward picture (i.e. list 1 reference picture). During a bi-prediction operation, in a first step for prediction of a PU, two prediction blocks 612 and 632 are generated by using a first initial motion vector (MV0) of list 0 and a second motion vector (MV1) of list 1, respectively, and are combined to form a single prediction signal. In the DMVR method, the two initial motion vectors (MV0 and MV1) of the bi-prediction are further refined by a bilateral template matching process. The bilateral template matching is applied in the decoder to perform a distortion-based search between a bilateral template 602 and the reconstruction samples in the reference pictures in order to obtain refined MVs without transmission of additional motion information. The list 0 and list 1 MVs (MV0 and MV1) can be decoded from either the AMVP mode or the merge/skip mode, depending on the inter-prediction mode used by the PU.

In DMVR, a bilateral template 602 is generated as the weighted combination (i.e. average) of the two prediction blocks, from the initial MV0 of list 0 and MV1 of list 1, respectively, as shown in FIG. 6. The template matching operation consists of calculating cost measures between the generated template 602 and the sample region (around the initial prediction block) in the reference picture. For each of the two reference pictures 610 and 630, the candidate MV that yields the minimum template cost is considered as the updated MV of that list to replace the initial MVs (MV0 and MV1). In one or more implementations, twenty-five MV candidates are searched for each list. The twenty-five MV candidates include the initial MVs and twenty-four surrounding MVs with up to ±2 luma sample offset to the original MVs in either the horizontal or vertical direction, or both. In a second step, the resulting refined MVs from the template matching process may be further refined with sub-pel refinement steps by using the parametric error surface equation. Finally, in a third step, the two updated MVs (MV0' and MV1') of the least template costs are used for generating the final uni-prediction results 614 and 634. The final prediction block for the current PU 622 is generated by averaging list 0 prediction block 614 and list 1 prediction block 634. A sum of absolute differences (SAD) is used as the cost measure.

In one or more implementations, the first step of the DMVR, i.e. the template matching process, may be replaced with a MV mirroring based refinement search. In the MV mirroring method, the candidate vectors for list 0 and list 1 are defined as MV0+MVdiff, and MV1−MVdiff, where MVdiff stands for one of e.g. 25 integer-pet refinement positions (e.g. MVdiff=(−1, 2)). The SAD cost is measured between the list 0 prediction block generated by using candidate vector MV0+MVdiff, and the list 1 prediction block generated by using candidate vector MV1−MVdiff, and the MVdiff with the least SAD cost is chosen as the selected refinement position. The MV mirror method doesn't require to generate template 602.

Figure 7:
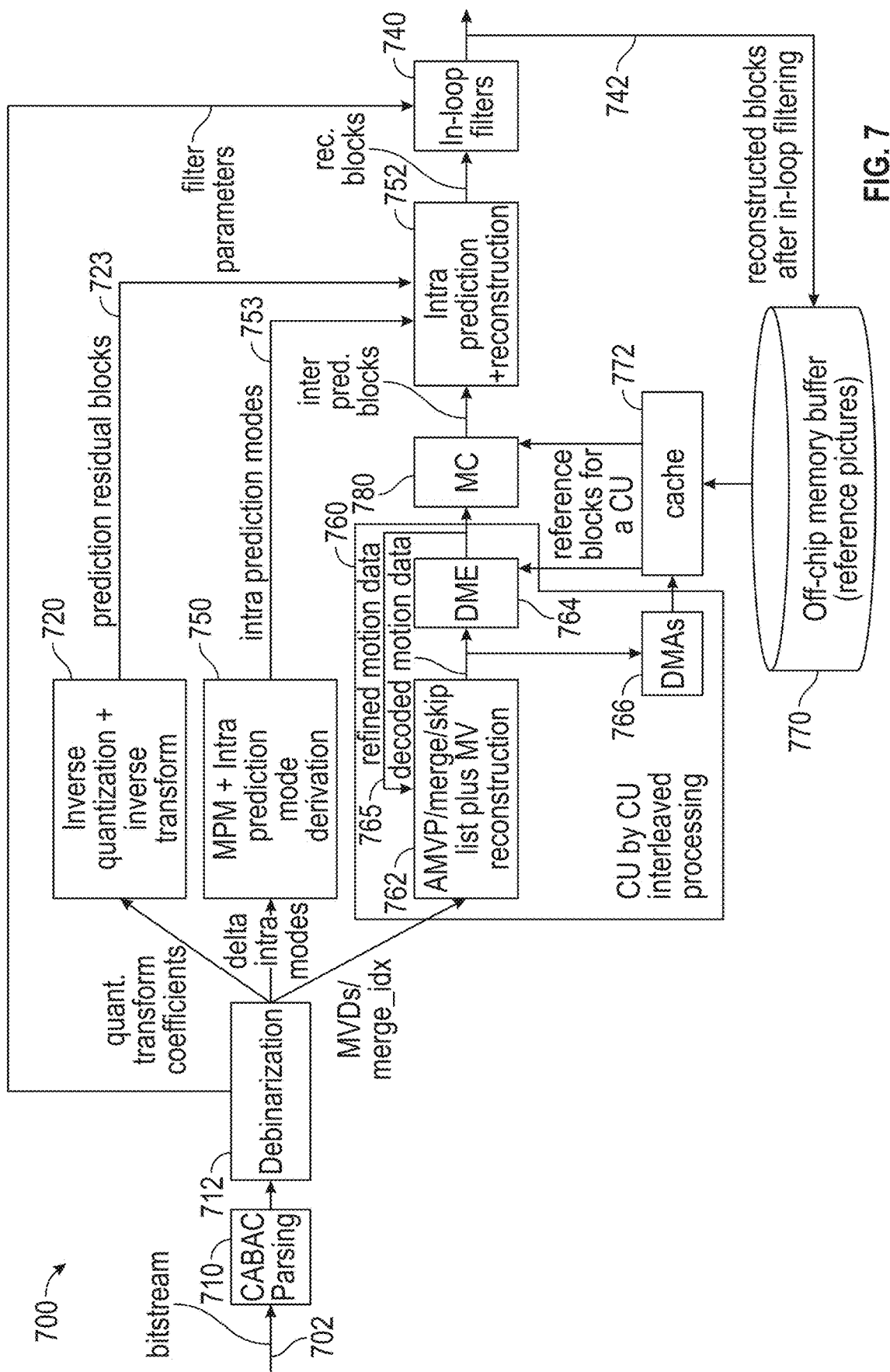
FIG. 7 illustrates a schematic diagram of an example of a pipelined VVC decoder.

FIG. 7 illustrates a schematic diagram of an example of a VVC decoder 700 (e.g. VTM1.0 version) for a pipelined decoder implementation. In the pipelined decoder implementation of the VVC decoder 700, reference pictures for motion compensation and DME are stored in an off-chip memory buffer 770. The VVC decoder 700 includes a number of functional blocks, and each functional block can process a DPR (e.g., a 64×64 lama region and associated chroma blocks) at a time for an efficient decoder pipeline processing. The functional blocks include a CABAC block 710, a de-binarization block 712, an inverse quantization and inverse transform block 720, an MPM and intra-prediction mode derivation block 750, an AMVP/merge/skip and MV reconstruction block 762, DMAs block 766, a DME block 764, an MC block 780, an intra-prediction and reconstruction block 752 and an in-loop filters block 740. A CU-by-CU interleaved processor 760 includes the AMVP/merge/skip and MV reconstruction block 762, the DME block 764 and the DMAs block 766. The reference pictures stored in the off-chip memory 770 are transferred from the off-chip memory buffer 770 into a cache 772 for use by the DME block 764 and the MC block 780.

The CABAC block 710 and the de-binarization block 712 convert an input bitstream 702 into coded symbols including quantized transform coefficients, filter parameters, and control information. The quantized transform coefficients are provided to the inverse quantization and inverse transform block 720 and the control information (e.g., delta intra prediction modes, MVDS and/or merge_idx) are passed to the MPM and intra-prediction mode derivation block 750 and the AMVP/merge/skip and MV reconstruction block 762. The inverse quantization and transform block 720 reconstructs the prediction residual blocks 723 based on the quantized transform coefficients and provides the prediction residual blocks 723 to the intra-prediction and reconstruction block 752.

The MRM and intra-prediction mode derivation block 750 produces intra-prediction modes 753 for intra-coded CUs of the DPR to be used by the intra-prediction and reconstruction block 752. The AMVP/merge/skip and MV reconstruction block 762 generates decoded motion data (motion vectors, prediction direction (list 0 and/or list 1) and reference picture indices) for inter-coded CUs of the DPR, set up the DMAs 766 by using the decoded motion data. The DMAs block 766 fetches reference blocks from the off-chip memory buffer into cache 772 for the DME block 764 and the MC block 780. The DME block 764 performs decoder-side motion refinement to produce a refined motion-data field for the DPR. The MC block 780 conducts motion compensation to produce inter-prediction blocks. The intra prediction and reconstruction block 752 uses intra prediction modes 753, prediction residual blocks 723 and inter-prediction blocks, received from the MC block 780, as input, performs intra prediction and generates the reconstructed blocks by adding intra/inter-prediction blocks and prediction residual blocks together. The in-loop filters block 740 filters the reconstructed blocks, using the filter parameters to produce the reconstructed CUs after in-loop filtering 742, which are stored in the off-chip memory buffer 770.

The CU-by-CU interleaved nature of the DME with AMVP/merge/skip list derivation and motion-data reconstruction creates a serious memory latency issue for hardware or embedded software decoder implementations, in which reference blocks used for motion compensation by the MC block 780 and decoder-side motion-vector refinement by the DME block 764 are stored on the off-chip memory buffer 770 and need to be scheduled and fetched in advance for a DPR before DME and MC take place. The DME relies on the motion-data reconstruction to provide the initial motion vectors (e.g., MV0 and MV1 of FIG. 6) for refinement. The initial motion vectors also determine where to fetch reference blocks from the off-chip memory buffer 770 for decoder-side motion vector refinement and motion compensation. The reference-block fetch from the off-chip memory buffer 770 takes a long time and thus has high latency. To avoid memory access latency, a pipelined decoder has to decode the entire motion data for a DPR in advance at one pipeline stage, so that all DMAs for the reference-block fetches of the DPR can be issued together at the second pipeline stage, and all the reference block data are available when the DME and/or MC are performed for CUs in the DPR at a following pipeline stage.

In the VVC decoder 700, the feedback path of the refined motion data 756 to the AMVP/merge/skip candidate list derivation and motion-data reconstruction process CU-by-CU prevents a decoder from decoding all the motion data and issuing all the reference block fetches for a DPR before the DME for the DPR takes place. In the VVC decoder 700, the AMVP/merge/skip candidate list derivation, the motion-data reconstruction, the DMA issuing for reference-block fetch and the DME have to be performed CU-by-CU interleaved, which makes the high throughput decoder implementation impossible due to memory latency caused by CU-by-CU reference block fetch within a DPR. The subject technology provides a solution to address the memory-access latency issue, as described in more detail herein.

Figure 8:
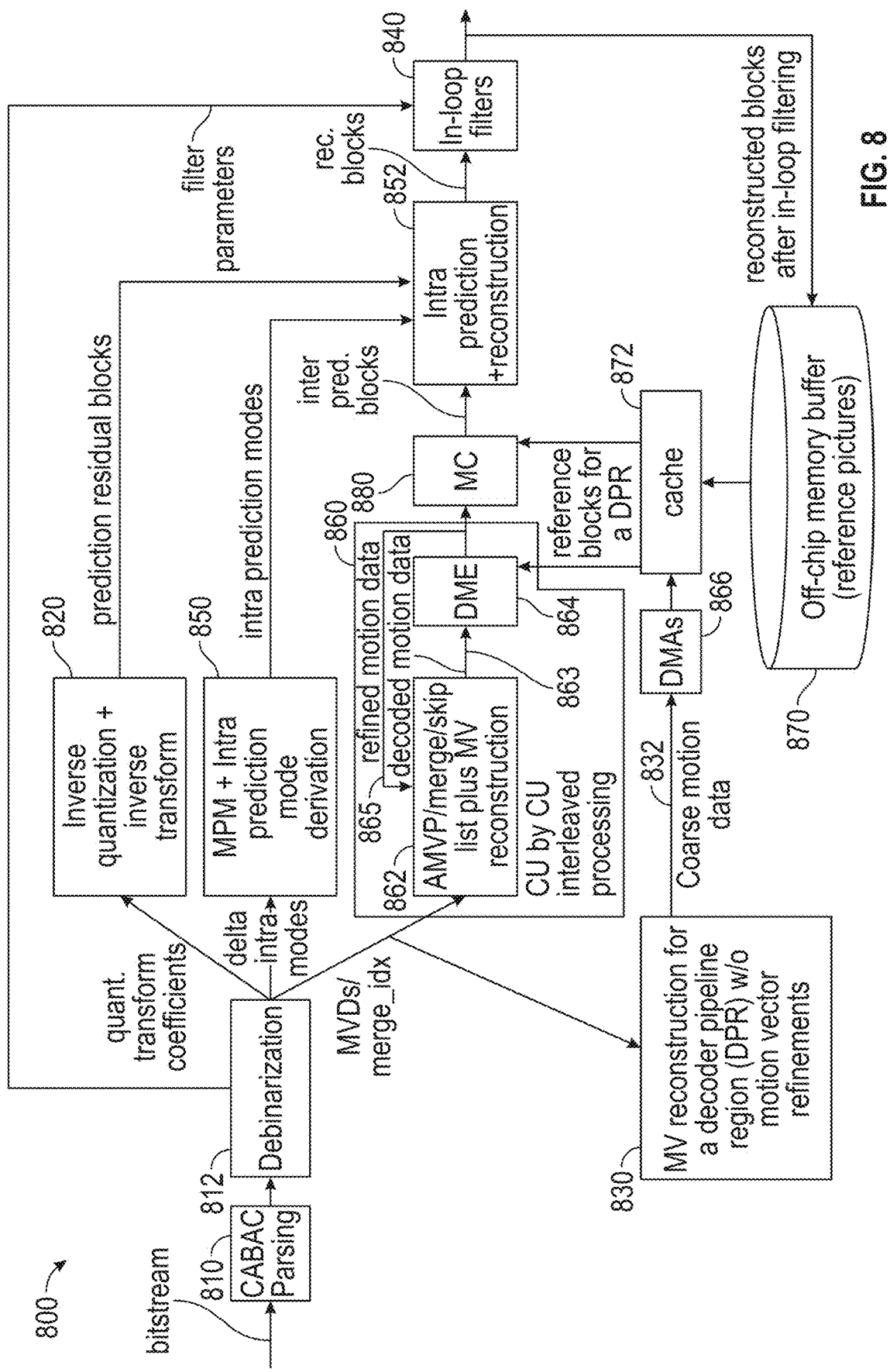
FIG. 8 illustrates a schematic diagram of an example of a pipelined VVC decoder with memory latency management, in accordance with one or more implementations of the subject technology.

FIG. 8 illustrates a schematic diagram of an example of a VVC decoder 800 for a pipelined decoder implementation with memory latency management, in accordance with one or more implementations of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The VVC decoder 800 includes a CABAC block 810, a de-binarization block 812, an inverse quantization and inverse transform block 820, an MPM and intra-prediction mode derivation block 850, a CU-by-CU interleaved processor 860 including an AMVP/merge/skip and MV reconstruction block 862 and a DME block 864, DMAs block 866, an MC block 880, an intra-prediction and reconstruction block 852 and an in-loop filters block 840. The functionalities of the above-mentioned blocks of the VVC decoder 800 are similar to the corresponding functional blocks of the VVC decoder 700 of FIG. 7. As described above, with respect to the VVC decoder 700 the reference pictures stored in the off-chip memory buffer 870 are transferred from the off-chip memory buffer 870 into a cache 872 for use by the DME block 864 and the MC block 880. The main difference between the VVC decoder 800 of the subject technology and the VVC decoder 700 of FIG. 7 resides in an additional functional block 830 that is introduced by the subject disclosure.

It is understood that the key to avoiding a memory latency issue is being able to fetch all the reference blocks for a DPR before the DME takes place for the DPR. Therefore, at least the DME has to be decoupled from the DMA reference-block fetches. However, performing the reference-block fetches needs the knowledge of all the motion data for the DPR. The additional functional block 830 introduced by the subject technology is a coarse motion-data reconstruction block that can perform MV reconstruction for a DPR without motion-vector refinements, and thus allows the motion-data reconstruction to be performed in two passes. The first pass is the coarse motion-data reconstruction pass that is performed by functional block 830 (hereinafter, the coarse motion data-reconstruction block 830). This coarse motion-data reconstruction pass, which is decoupled from the DME and is done on a DPR basis, provides coarse motion data 832 for fetching all required reference blocks needed by a DPR. Note that the coarse motion data 832 may be different from the refined motion data 865 provided by the DME block 864 for MC block 880. This is because the refined motion data 865 is not fed back to the coarse motion-data reconstruction process performed by the coarse motion-data reconstruction block 830.

The second pass is performed by the AMVP/merge/skip list plus MV reconstruction block 862. This pass of motion-data reconstruction is interleaved with the refined motion data 865 from the DME block 864 at the CU level, but is decoupled from the reference-block fetch to avoid a memory-latency issue. In this pass, the refined motion data 865 is fed back to the AMVP/merge/skip candidate list and MV reconstruction block 862 to produce accurate decoded motion data 863 for the MC process.

The two-pass motion-data reconstruction method effectively resolves the memory-access latency issue and makes decoder-side motion refinement possible for high throughput decoder implementation, as the reference blocks for a DPR can be pre-fetched by using the coarse motion data 832. The motion-data reconstruction for a PU requires the AMVP candidate list derivation for AMVP mode in which MVDs are signaled, or the merge/skip candidate list derivation for merge/skip mode in which only merge index is signaled. The AMVP or the merge/skip candidate list derivation uses spatial motion-data neighbors and temporal motion data neighbors shown and discussed above with respect to FIG. 5. It is understood that in the coarse motion-data reconstruction performed by the coarse motion-data reconstruction block 830, the spatial motion-data neighbors may not be as accurate, as the DME is not performed for PUs of the DME mode of the DPR.

Figure 9:
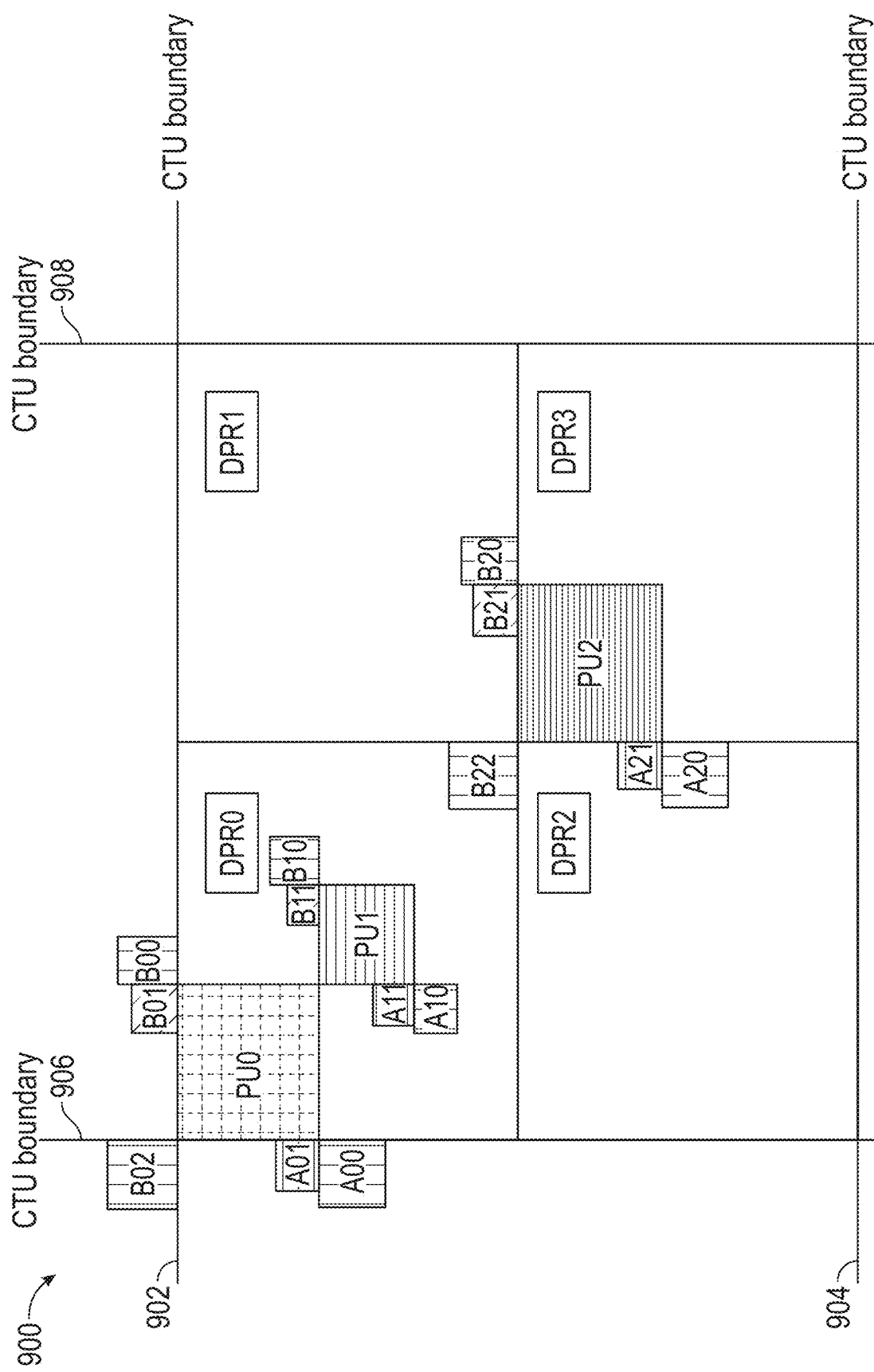
FIG. 9 illustrates an example of spatial motion data neighbors in coarse motion-data reconstruction, in accordance with one or more implementations of the subject technology.

FIG. 9 illustrates an example of spatial motion-data neighbors in the coarse motion-data reconstruction, in accordance with one or more implementations of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

FIG. 9 highlights handling of spatial motion-data neighbors in the coarse motion-data reconstruction process discussed above with respect to FIG. 8. As shown in FIG. 9, a CTU 900 identified by the CTU boundaries 902, 904, 906 and 908 can be divided into multiple DPRs based on the maximum TU size (e.g., a 128×128 CTU is divided into four 64×64 DPRs such as DPR0, DPR1, DPR2 and DPR3), and a DPR may contain multiple PUs. For example, for DPR0, PU0 and PU1 are shown, and for DPR3, only PU2 is shown with corresponding spatial motion data neighbors (A20, A21, B20, B21 and B22).

To avoid additional storage of motion-data line and column buffers, for the spatial motion-data neighbors along the CTU boundaries 902 and 906, the accurate motion data after DME is used. For example, for PU0 in FIG. 9, the spatial neighboring A00, A01, B00, B01 and B02 are all accurate motion data. Therefore, the AMVP or the merge/skip candidate list derivation for PU0 is still accurate. However, the resulting motion data for PU0 may not be accurate if PU0 uses DME mode because the DME is not performed for PU0 in this process. The resulting motion data for PU0 in this process is just signaled MVDs plus AMVP predictors for AMVP mode or picking the elated motion data from the merge/skip candidate list based on signaled merge index for merge/skip mode, regardless of whether it uses the DME mode or not.

To decouple the motion-data reconstruction from the DME, for the spatial motion-data neighbors inside a CTU, non-accurate motion data (before DME) is used. For example, for PU1 in FIG. 9, with shown spatial neighbors A11, A10, B10 and B11, the PU0 is used as one of its spatial neighbors (e.g., instead of B12). The resulting motion data of PU0 is directly fed into the AMVP or merge/skip candidate list derivation process of PU1. The resulting motion data of PU0 may not be accurate if it uses the DME mode. Consequently, the inaccurate spatial neighbors may lead to inaccurate motion-data reconstruction for PU1 as well.

In one or more implementations, non-accurate motion data (before DME) may be used for all spatial motion-data neighbors in the coarse motion-data reconstruction process. For example, for PU0 in FIG. 9, the spatial neighboring A00, A01, B00, B01 and B02 are also contain non-accurate motion data (before DME).

The handling of spatial motion-data neighbors defined above also guarantees a coarse motion-data reconstruction process agnostic to DPR size. For example, in FIG. 9, the coarse motion-data field for a CTU is the same regardless whether of a decoder chooses to use a DPR size equal to CTU size or to divide a CTU into multiple DPRs.

Figure 10:
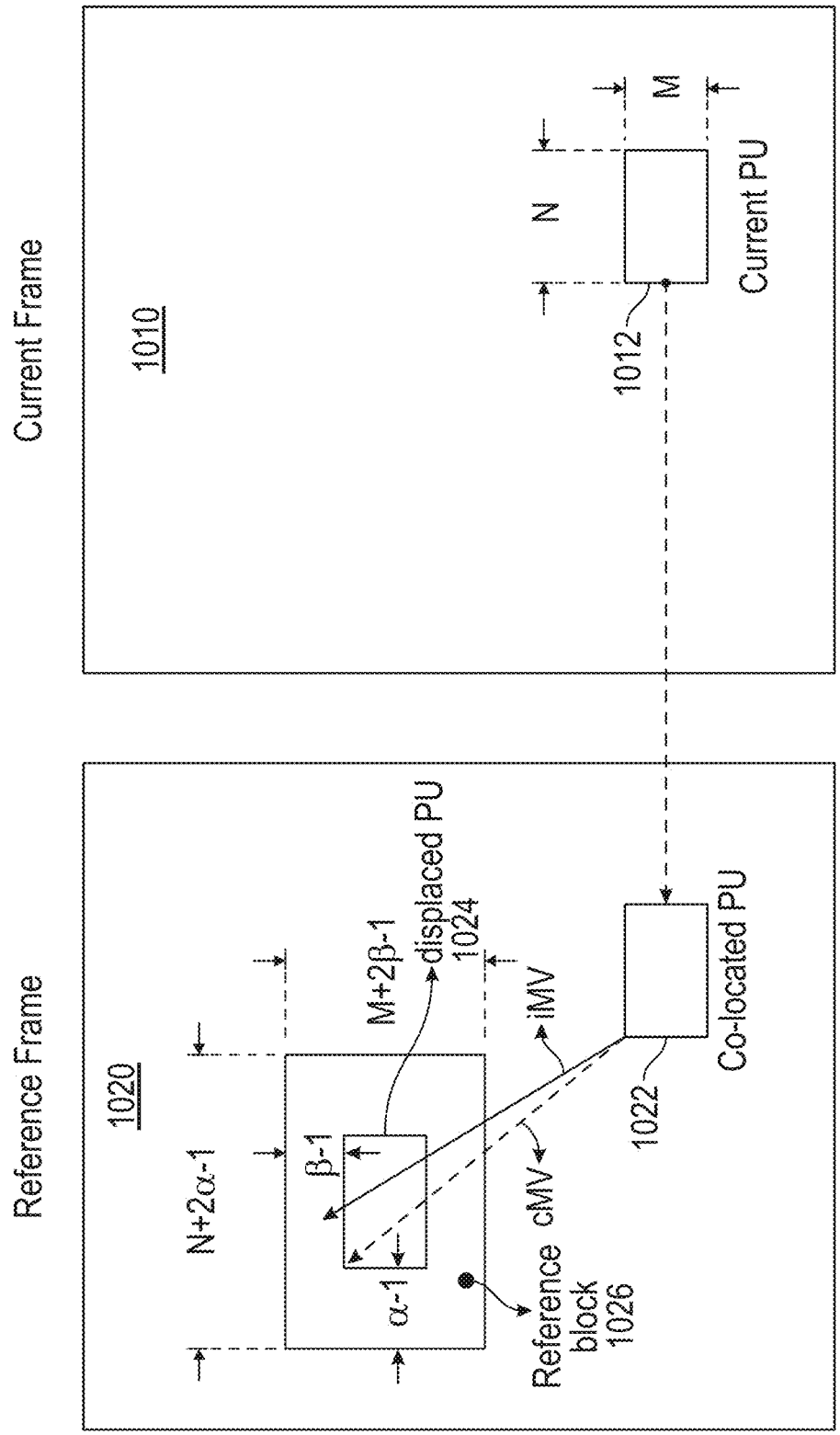
FIG. 10 conceptually illustrates an example of a reference block for decoder-side motion estimation (DME) and motion compensation (MC), in accordance with one or more implementations of the subject technology.

FIG. 10 conceptually illustrates an example of a reference block for decoder-side motion estimation (DME) and motion compensation (MC), in accordance with one or more implementations of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

FIG. 10 shows a current picture 1010 including current PU 1012 and a list 0 or list 1 reference picture 1020 including a co-located PU 1022 and a displaced PU 1024 within a reference block 1026. The co-located PU 1022 corresponds to the current PU 1012. In some implementations, the reference block 1026 for the current PU 1012 is fetched around the coarse motion vector (cMV) provided by the coarse motion-data reconstruction process (e.g., by the coarse-motion data reconstruction block 830 of FIG. 8), while the DME is performed around an initial motion vector (iMV) derived by the second pass of the motion-data reconstruction (described above with respect to FIG. 8), which uses refined motion data after DME as spatial neighbors. Besides difference in usage of refined motion data, the derivation process of MVs for the DME in the second pass may also be different from the coarse motion-data reconstruction process. Consequently, the cMV for reference-block fetch may be different from the iMV for decoder-side motion refinement as depicted in FIG. 10. To avoid need of additional memory bandwidth, there are three ways to handle the mismatch between cMV and iMV. First, a conforming bitstream guarantees that both the MC using the resulting motion data after DME and the DME would not require access of reference samples outside the reference block 1026. Second, a conforming bitstream guarantees that the resulting motion vector after DME would not require access of reference samples outside the reference block 1026 for the MC only, but may allow the DME to access reference samples outside the reference block 1026 during the decoder-side motion refinement, especially in the case in which interpolation filters used for the DME and the MC may be different. If a reference sample for the DME is outside the reference block 1026, the nearest reference-block boundary sample may be used. Third, a conforming bitstream allows both the DME and MC to access reference samples outside the reference block 1026. If a reference sample for the DME and/or MC is outside the reference block 1026, the nearest reference-block boundary sample may be used.

The DME for a PU of one prediction direction (list 0 or list 1) may also be performed around multiple initial motion vectors, the same rules defined above can be applied to handling access restriction of the reference blocks for the DME and the MC.

The reference-block handling restriction defined above may be relaxed in the horizontal direction based on memory burst alignments. For example, reference blocks may always be four bytes aligned in the horizontal direction, in which case the vertical reference-block boundaries may be extended to four bytes aligned locations.

As shown in FIG. 10, the reference block 1026 for a current PU 1012 is fetched around the cMV by extending a few samples around the displaced PU 1024 in four directions. For example, for the displaced PU 1024 of N×M block size, a reference block of size $(N+2\alpha-1)\times(M+2\beta-1)$ may be fetched. Parameters $(\alpha, \beta)$, which determine the reference block size together with N and M, may or may not be made PU size dependent, may be signaled in high-level headers such as a sequence header (parameter set), picture header (parameter set), slice header, etc., or be fixed for all the PU block sizes without signaling.

Figure 11:
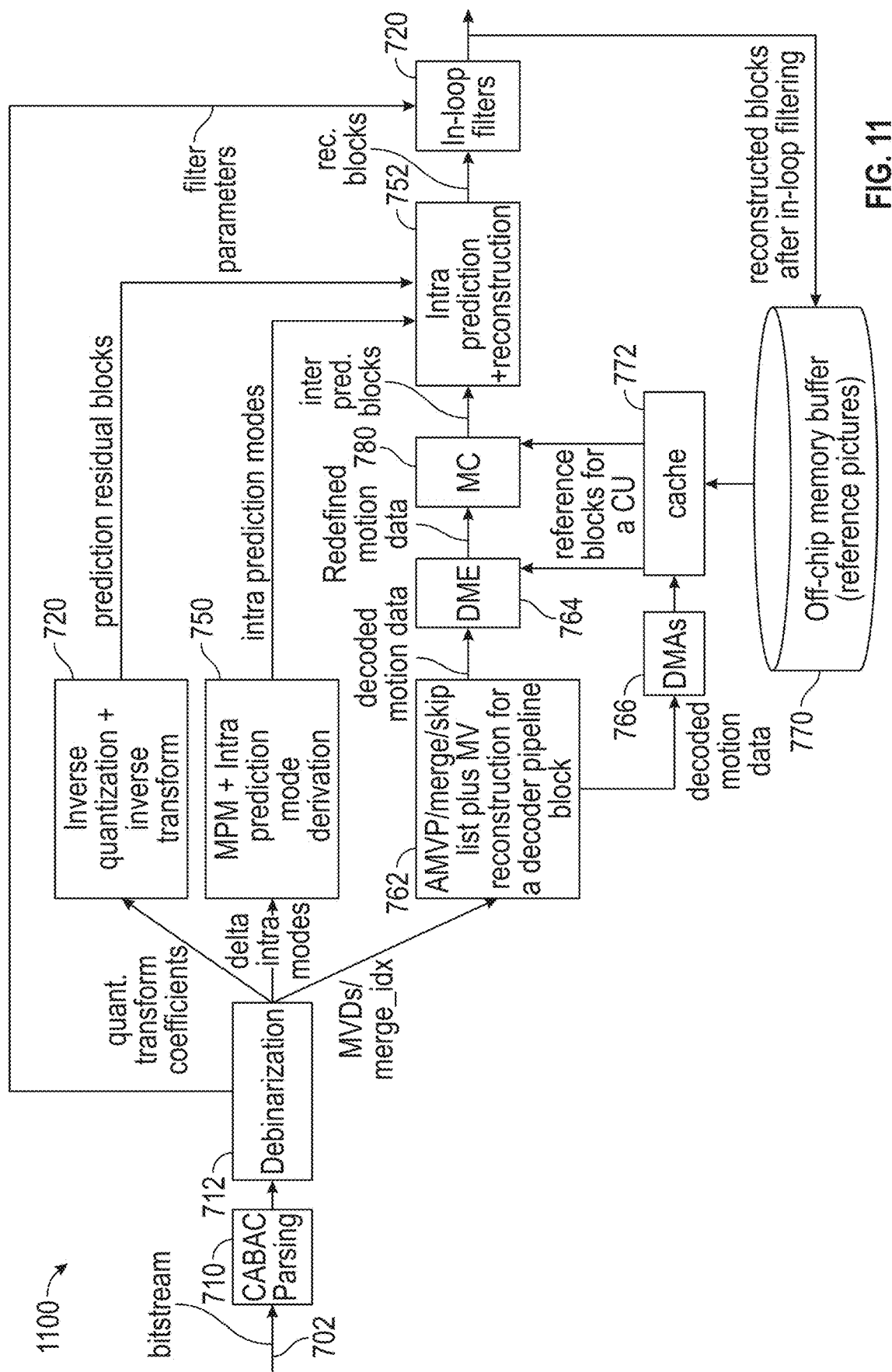
FIG. 11 illustrates a schematic diagram of another example of a pipelined VVC decoder with memory latency management in accordance with one or more implementations of the subject technology.

FIG. 11 illustrates a schematic diagram of another example of a VVC decoder 1100 for a pipelined decoder implementation with memory latency management, in accordance with one or more implementations of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The VVC decoder 1100 is similar to the VVC decoder 700 of FIG. 7, except for feedback path for the refined motion data 756 of FIG. 7 that is removed from the VVC decoder 1100. Removing this feedback path to the AMVP/merge/skip list derivation plus motion-data reconstruction block 762 resolves the memory latency issue discussed above, as explained herein. As a result of the removal of the feedback path of the refined motion data 756, the DME 764 is decoupled from the motion-data reconstruction process and reference-block fetch from the off-chip memory buffer 770, the decoded motion data can be reconstructed and reference block fetches can be issued on a DPR basis instead of a CU basis, effectively avoiding the memory latency issues. In this embodiment, the same decoded motion data may be used for fetching reference-block data and for the DME (as initial motion vectors) of a DPR. Although in this embodiment the initial motion vector (iMV) and the initial motion vector (iMV) in FIG. 10 are identical, a conforming bitstream may still allow both the DME and MC to access reference samples outside the reference block 1026. If a reference sample for the DME and/or MC is outside the reference block 1026, the nearest reference-block boundary sample may be used.

In some aspects, the implementation described in FIG. 11 may be less efficient in terms of compression efficiency when compared to the implementation described in FIG. 8.

Figure 12:
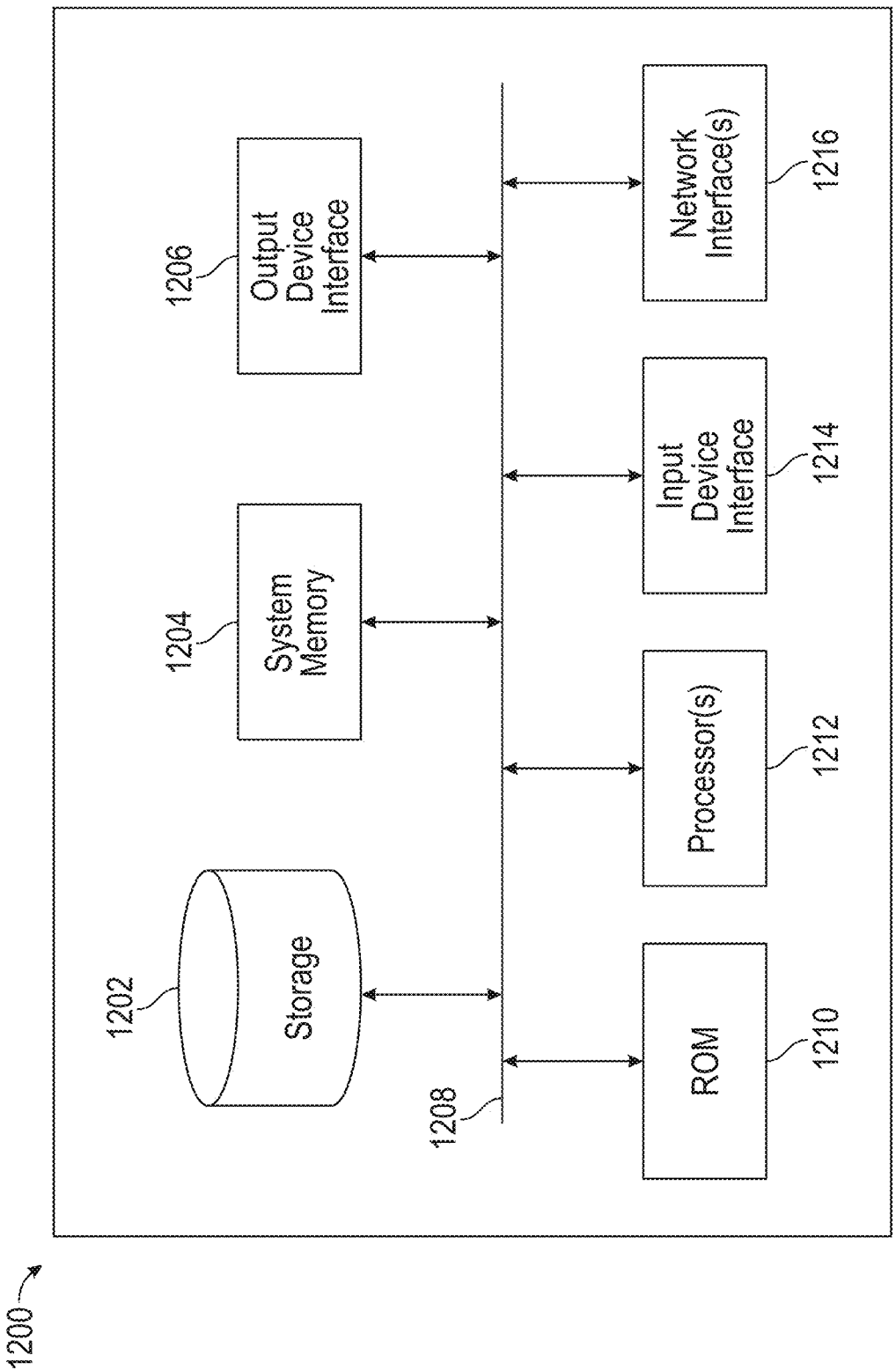
FIG. 12 conceptually illustrates an electronic system with which any implementations of the subject technology are implemented.

FIG. 12 conceptually illustrates an electronic system 1200 with which one or more implementations of the subject technology may be implemented. The electronic system 1200, for example, can be a network device, a media converter, a desktop computer, a laptop computer, a tablet computer, a server, a switch, a router, a base station, a receiver, a phone, or generally any electronic device that transmits signals over a network. Such an electronic system 1200 includes various types of computer readable media and interfaces for various other types of computer readable media. In one or more implementations, the electronic system 1200 is, or includes, one or more of the devices 122, 124, 126, 128 and 110, the 360 video projection format decision device, and/or the 360 video playback device. The electronic system 1200 includes a bus 1208, one or more processing unit(s) 1212, a system memory 1204, a read-only memory (ROM) 1210, a permanent storage device 1202, an input device interface 1214, an output device interface 1206, and a network interface 1216, or subsets and variations thereof.

The bus 1208 collectively represents all system, peripheral, and chipset buses that communicatively connect the numerous internal devices of the electronic system 1200. In one or more implementations, the bus 1208 communicatively connects the one or more processing unit(s) 1212 with the ROM 1210, the system memory 1204, and the permanent storage device 1202. From these various memory units, the one or more processing unit(s) 1212 retrieves instructions to execute and data to process in order to execute the processes of the subject disclosure. The one or more processing unit(s) 1212 can be a single processor or a multicore processor in different implementations.

The ROM 1210 stores static data and instructions that are needed by the one or more processing unit(s) 1212 and other modules of the electronic system. The permanent storage device 1202, on the other hand, is a read-and-write memory device. The permanent storage device 1202 is a non-volatile memory unit that stores instructions and data even when the electronic system 1200 is off. One or more implementations of the subject disclosure use a mass-storage device (such as a magnetic or optical disk and its corresponding disk drive) as the permanent storage device 1202.

Other implementations use a removable storage device (such as a floppy disk, flash drive, and its corresponding disk drive) as the permanent storage device 1202. Like the permanent storage device 1202, the system memory 1204 is a read-and-write memory device. However, unlike the permanent storage device 1202, the system memory 1204 is a volatile read-and-write memory, such as random access memory. System memory 1204 stores any of the instructions and data that the one or more processing unit(s) 1212 needs at runtime. In one or more implementations, the processes of the subject disclosure are stored in the system memory 1204, the permanent storage device 1202, and/or the ROM 1210. From these various memory units, the one or more processing unit(s) 1212 retrieves instructions to execute and data to process in order to execute the processes of one or more implementations.

The bus 1208 also connects to the input device interface 1214 and the output device interface 1206. The input device interface 1214 enables a user to communicate information and select commands to the electronic system. Input devices used with the input device interface 1214 include, for example, alphanumeric keyboards and pointing devices (also called "cursor control devices"). The output device interface 1206 enables, for example, the display of images generated by the electronic system 1200. Output devices used with the output device interface 1206 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 12, the bus 1208 also couples the electronic system 1200 to one or more networks (not shown) through one or more network interfaces 1216. In this manner, the computer can be a part of one or more network of computers (such as a local area network (LAN), a wide area network (WAN), or an Intranet, or a network of networks, such as the Internet). Any or all components of the electronic system 1200 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in an format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multicore processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a. transitional word in a claim.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

The predicate words "configured to," "operable to," and "programmed to" do not imply any particular tangible or intangible modification of a subject but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

What is claimed is:

1. A system comprising:
   memory; and
   at least one processor coupled to the memory and configured to:
      process a received bitstream to generate quantized data and control data;
      generate decoded motion data based on a portion of the control data;
      fetch one or more reference blocks associated with a current prediction unit (PU) of a decoder-pipeline region (DPR) based on the decoded motion data;
      generate refined motion data based on the decoded motion data and the one or more reference blocks; and generate one or more inter-prediction blocks based on the refined motion data and the one or more reference blocks by performing a motion compensation operation.

2. The system of claim 1, wherein the processor is configured to generate the decoded motion data by performing a motion-data reconstruction operation.

3. The system of claim 2, wherein the processor is configured to generate refined motion data by using a decoder-side motion estimation (DME) operation that excludes feedback of the refined motion data to the motion-data reconstruction operation.

4. The system of claim 1, wherein the processor is further configured to generate the one or more inter-prediction blocks prior to generating the refined motion data.

5. The system of claim 1, wherein the control data comprises inter-prediction parameters and intra-prediction parameters, and the portion of the control data comprises inter-prediction parameters including motion vector differences (MVDs) and merge indices.

6. A pipeline video decoder comprising:
an engine configured to receive a bitstream and to convert the bitstream into symbol data including pixel data and control parameters;
a coarse-motion data reconstruction block configured to generate decoder-pipeline region (DPR)-based coarse motion data based on a portion of the control parameters;
a direct memory accesses (DMA) block configured to fetch reference data associated with a current prediction unit (PU) of a DPR based on the coarse motion data; and
a reconstruction block configured to generate decoded motion data based on the portion of the control parameters and feedback refined motion data,
wherein the feedback refined motion data is generated by a decoder-side motion estimation (DME) block based on decoded motion data generated by the reconstruction block for a previous PU of the DPR and reference data associated with the previous PU of the DPR.

7. The pipeline video decoder of claim 6, wherein the reconstruction block is configured to generate the decoded motion data by interleaving a motion-data reconstruction with the feedback refined motion data at a coding unit (CU) level, and wherein generating the decoded motion data is decoupled from fetching the reference data.

8. The pipeline video decoder of claim 6, wherein the portion of the control parameters comprise inter-prediction parameters including MVDs and merge indices.

9. The pipeline video decoder of claim 6, wherein the decoded motion data comprises an initial motion vector, and wherein the DME block is configured to perform a DME operation around the initial motion vector to generate the feedback refined motion data.

10. The pipeline video decoder of claim 9, wherein the reference data comprises a reference block, and wherein the DMA block is configured to fetch the reference block for the current PU around a coarse motion vector by extending a displaced PU corresponding to the current PU in four directions.

11. The pipeline video decoder of claim 9, further comprising a motion compensation (MC) block, and wherein the DME block and the MC block are configured to access reference samples outside a pre-fetched reference block by performing reference pixel padding.

12. The pipeline video decoder of claim 11, wherein in a reference pixel padding a nearest reference-block boundary sample is used for operations of the DME block and the MC block.

13. A method comprising:
receiving, by an engine, a bitstream;
converting, by the engine the bitstream into symbol data including pixel data and control parameters;
generating decoder-pipeline region (DPR)-based coarse motion data based on a portion of the control parameters;
fetching reference data associated with a current prediction unit (PU) of a DPR based on the coarse motion data; and
generating decoded motion data based on the portion of the control parameters and feedback refined motion data generated based on decoded motion data generated for a previous PU of the DPR and reference data associated with the previous PU of the DPR.

14. The method of claim 13, further comprising generating the decoded motion data by interleaving a motion-data reconstruction with the feedback refined motion data at a coding unit (CU) level.

15. The method of claim 14, wherein generating the decoded motion data is decoupled from fetching the reference data.

16. The method of claim 14, wherein the portion of the control parameters comprise inter-prediction parameters including MVDs and merge indices.

17. The method of claim 14, wherein the decoded motion data comprises an initial motion vector, and wherein the method further comprises performing a decoder-side motion estimation (DME) operation around the initial motion vector to generate the feedback refined motion data.

18. The method of claim 17, wherein the reference data comprises a reference block, and wherein the method further comprises fetching the reference block for the current PU around a coarse motion vector by extending a displaced PU corresponding to the current PU in four directions.

19. The method of claim 17, further comprising accessing reference samples outside a pre-fetched reference block by performing reference pixel padding.

20. The method of claim 17, further comprising using, in a reference pixel padding, a nearest reference-block boundary sample for operations of a DME block and a motion compensation (MC) block.

* * * * *